(12) United States Patent
Sukegawa

(10) Patent No.: US 7,266,224 B2
(45) Date of Patent: Sep. 4, 2007

(54) PERSON RECOGNIZING APPARATUS, PERSON RECOGNIZING METHOD AND PASSAGE CONTROLLER

(75) Inventor: Hiroshi Sukegawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 807 days.

(21) Appl. No.: 10/647,744

(22) Filed: Aug. 26, 2003

(65) Prior Publication Data

US 2004/0086157 A1    May 6, 2004

(30) Foreign Application Priority Data

Nov. 1, 2002   (JP)   ............... 2002-320156

(51) Int. Cl.
*G06K 9/00*   (2006.01)
(52) U.S. Cl. .................................... 382/118
(58) Field of Classification Search ............... None
See application file for complete search history.

(56) References Cited

U.S. PATENT DOCUMENTS 5,040,213 A * 8/1991 Yasuda et al. ............... 704/244
6,608,914 B1 * 8/2003 Yamaguchi et al. ......... 382/118

FOREIGN PATENT DOCUMENTS

| JP | 10-312462 | 11/1998 |
| JP | 11-167632 | 6/1999 |
| JP | 11-175718 | 7/1999 |
| JP | 2000-339466 | 12/2000 |

* cited by examiner

*Primary Examiner*—Joseph Mancuso
*Assistant Examiner*—Alex Liew
(74) *Attorney, Agent, or Firm*—Pillsbury Winthrop Shaw Pittman, LLP

(57) ABSTRACT

A person recognizing apparatus inputs a face image of a person subject to recognition through a camera and obtains the similarity of this input face image with the registered information stored in the registered information memory pre-storing face images of recognized persons by collating them by the recognizer. Therefore, in this person recognizing apparatus to recognize a said person based on the obtained similarity, a registered information updating unit judges whether the similarity obtained by a recognizer is within a prescribed updating range and updates a registered information stored in the registered information memory based on the face image input by the camera based on being judged as the similarity is in the prescribed updating range.

2 Claims, 9 Drawing Sheets

PERSON RECOGNIZING APPARATUS, PERSON RECOGNIZING METHOD AND PASSAGE CONTROLLER

CROSS-REFERENCE TO RELATED APPLICATION

This application is based upon and claims the benefit of priority from the prior Japanese Patent Application No. 2002-320156, filed on Nov. 1, 2002, the entire contents of all of which are incorporated herein by reference.

BACKGROUND OF THE INVENTION

1. Field of the Invention

The present invention relates to a person recognizing apparatus and a person recognizing method to recognize an applicable person using biometric information such as an image including at least a face (hereinafter, refer as a face image), a fingerprint image, an iris information, a hand geometry image, finger images, voice information, for instance, in the security management.

Further, the present invention relates to a passage controller to control passage of a passenger (for example, who enters/exits to/from a security facility using the above-mentioned person recognizing apparatus.

2. Description of Related Art

Generally, this kind of person recognizing apparatus obtains biometric information of a person who is subject to the recognition. Biometric information of a person who is subject to the recognition is pre-stored in a registered information memory as registered information. Biometric information obtained from a person is collated with registered information stored in the registered information memory. Similar points of both biological data are obtained by this collation and an applicable person is recognized based on this similarity.

In such the person recognizing apparatus, however, a person may be erroneously recognized sometimes when collating a face image for age-related changes in features of a face, a posture of a person or a face direction. As a countermeasure to reduce this erroneous recognition, there is a proposed technology to automatically update dictionary (a registered information retaining means) recording biometric information of features of persons as registered information in advance.

For example, the Japanese Patent Application No. 1999-167632 discloses a technology to preset a re-registering threshold value higher than a recognizing threshold value separately from the recognized threshold value and update a registered information (a dictionary) when the similarity obtained in the collation is higher than the re-registering threshold value.

Further, the Japanese Patent Application No. 1998-312462 discloses a technology that is in a structure to reduce recognized threshold values in combination with the input of ID codes or personal identification numbers and update the registered information (a dictionary) when succeeded in the collation without reducing recognized threshold values.

However, in the technologies disclosed in the Japanese Patent Application Numbers 1999-167632 and 1998-312462, the registered information (a dictionary) is updated only when a recognized person is fully confirmed. Therefore, only data closer to the learnt contents are learnt and the registered information is automatically updated.

In addition, information effective for reducing the erroneous recognition of registered persons is not a portion having a sufficient priority for an authentication threshold value but such data that becomes the number of points close to an authentication threshold value. Therefore, the automatic updating method according to the above-mentioned Japanese Patent Application Numbers 1999-167632 and 1998-312462 has a less effect. Further, when trying to have the system to learn the number of points close to an authentication threshold value using these methods, another person may possibly be learnt erroneously because whether the person is truly the recognized person is not confirmed.

SUMMARY OF THE INVENTION

An object of this invention is to provide a person recognizing apparatus, a person recognizing method and a passage controller capable of reducing an erroneous recognizing rate for secular change of person, variation of input information in the authentication.

Further, another object of this invention is to provide a person recognizing apparatus, a person recognizing method and a passage controller capable of leaning effective registered information (a dictionary) without increasing a burden applied on a recognized person.

According to this invention, a person recognizing apparatus is provided. This apparatus comprises a biometric information input unit to input biometric information of persons subject to recognition; a registered information memory to store biometric information of persons subject to recognition in advance as registered information; a recognizer to obtain similarities of biometric information input by the biometric information input unit and registered information stored in the registered information memory by collating both of them and recognize the person based on the obtained similarity; and a registered information updating unit to judge whether the similarity obtained by the recognizer is within a prescribed updating range and based on being judged as the similarity is within the prescribed updating range, update the registered information stored in the registered information memory by using the biometric information input by the biometric information input unit.

Further, according to this invention, a person recognizing method is provided. This method comprises inputting biometric information of a person subject to recognition; obtaining similarities of the input biometric information and the registered information pre-stored in a registered information memory as biometric information of a person subject to recognition by collating them; recognizing the person based on the obtained similarity; judging whether the obtained similarity is within the prescribed updating range; and updating the registered information stored in the registered information memory based on being judged as the similarity is within the prescribed updating range by using the biometric information input in the inputting step.

Further, according to this invention, a passage controller is provided for controlling the passage of a person by recognizing the passenger. This controller comprises a biometric information input unit to input biometric information of the passenger; a registered information memory to store biometric information of a passenger who is preliminary subject to the recognition; a recognizer to obtain a similarity of the biometric information input by the biometric information input unit with the registered information stored in the registered information memory by collating them and recognizes the passenger based on the obtained similarity; a registered information updating unit to judge whether the similarity obtained by the recognizer is within a prescribed updating rang and based on being judged as the similarity is within the prescribed updating range, update the registered information stored in the registered information memory by using the biometric information input by the biometric information input unit; and a passage controller to control the passage of the passenger according to the recognized result of the recognizer.

DETAILED DESCRIPTION OF A PREFERRED EMBODIMENT OF THE INVENTION

Preferred embodiments of this invention will be described below referring to the attached drawings.

Further, in the following explanation, a case using a face image as a biometric information of a person is described; however, even when biometric information other than a face image, i.e. fingerprint image, iris image, hand geometry image, finger image, voice information are used, this invention is also applicable similarly.

First, a first embodiment of this invention will be explained.

Figure 1:
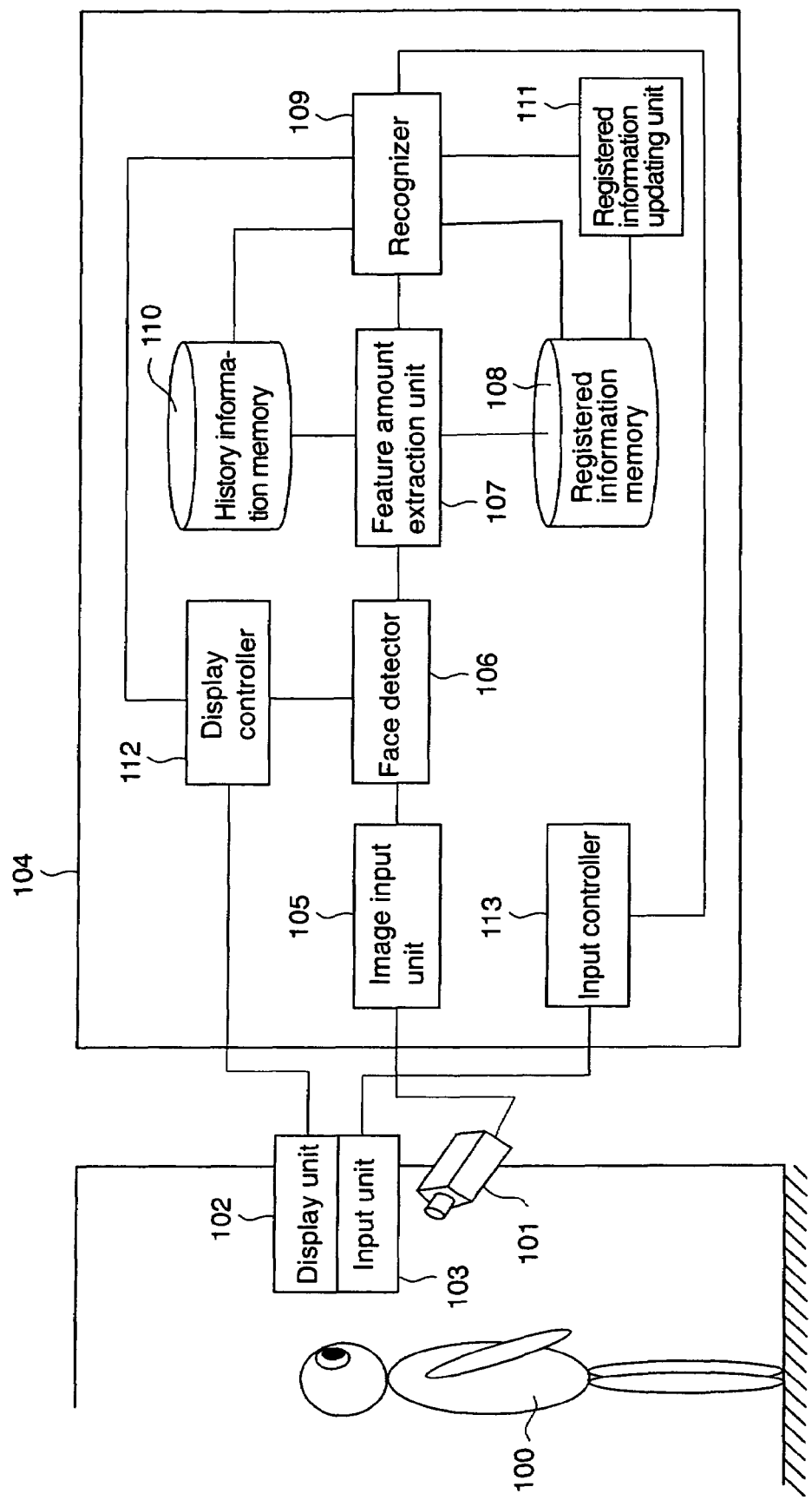
FIG. 1 is a block diagram schematically showing the structure of the person recognizing apparatus involved in a first embodiment.

FIG. 1 schematically shows the structure of the person recognizing apparatus involved in the first embodiment.

This person recognizing apparatus comprises a camera 101, a display 102, an input unit 103 and a processor 104.

The camera 101 functions an image inputting means to take a face image (including at least a face) of a recognized person 100 and input them into the unit.

The display 102 functions as a display to display the face image input for a recognized person 100 and various kinds of guidance.

The input unit 103 functions as a described information input means to input such described information as ID numbers/personal identification numbers specifying a recognized person 100.

The processor 104 processes face images that are input from the camera 101 and executed the face image recognizing process.

Further, although not illustrated, an illuminating means is provided near the camera 101 (for example, upper right or left) as necessary to apply the light toward at least faces of a registered person 100 at a fixed intensity.

Further, in the following explanation, various information including status information such as image input data, extracted feature amount, subspace, eigenvector for forming subspace, correlative matrix, time, date and place of registration, individual information such as personal identification number, ID code, etc. will appear. Recognizes data include subspace or eigenvector for forming subspaces and registered information include image input data, extracted feature amount, subspace, eigenvector for forming subspaces, correlative matrix, status and individual information. Therefore, recognized data are included in registered information.

The camera 101 takes a face image of a recognized person 100 at a specified angle from below and input them as the biometric information. The camera 101 is composed of, for example, a TV camera using an image pickup device such as a CCD sensor.

The display 102 is a monitor to display the face image of a recognized person 100 taken by the camera 101, various kinds of guidance, processing results, etc. The display 102 is provided at a position, for example, above the camera 101 corresponding to the face portion of a recognized person 100.

The input unit 103 is used to input personal identification numbers used to confirm that person is a recognized person 100 or input identification information to specify biometric information out of registered biometric information. Definitely, for example, this input unit 103 can be a ten-key, a touch panel or a card reader to read IC cards, magnetic cards or wireless cards.

The processor 104 composes an image input unit 105, a face detector 106, a feature amount extraction unit 107, a registered information memory (dictionary) 108, a recognizer 109, a history information memory 110, a history information updating unit 111, a display controller 112 and an input controller 113.

The image input unit 105 inputs face images from the camera 101.

The face detector 106 is a face detecting means to detect the positions of a face and its parts such as eyes, a nose by collating with a pattern dictionary prepared in advance using a face image of a person obtained from the image input unit 105.

The feature amount extraction unit 107 is a means to extract a feature amount of a face, for example, light and dark or subspace information based on the output of the face detector 106.

The registered information memory (a dictionary) 108 is a registered information storage means to store features amount of a face extracted by the feature amount extraction unit 107 as recognized data (recognized information) when registering personal information.

The recognizer 109 is a recognizing means to recognize faces of a recognized person 100 by collating the features amount of faces extracted by the feature amount extraction unit 107 with the recognized data (registered information) registered in the registered information memory 108.

The history information memory 110 is a history information storage means to record images input from the image input unit 105 and face feature amount extracted by the feature amount extraction unit 107.

The registered information updating unit 111 is a registered information updating means to judge whether registered information should be updated by setting an updating range and update registered information stored in the registered information memory 108.

The display controller 112 controls the display 102.

The input controller 113 controls the input unit 103.

The image input unit 105 inputs a face image from the camera 101, digitizes A/D conversion and then, sends to the face detector 106.

The face detector 106 first detects the face area of a recognized person 100 from the face image input from the image input unit 105. For example, while moving a template prepared in advance in the face image by moving in the face image, correlative values are obtained and a place having the highest correlative value is determined as a face area. Further, a face detecting means such as a face area extraction method using an eigenspace method or a subspace method is usable.

The face detector 106 then detects positions of parts composing a face such as eyes, nose, and mouth from the detected face area. For example, a method disclosed in a literature (Kazuhiro FUKUI, Osamu YAMAGUCHI: "Facial Feature Point Extraction Method Based on Combination of Shape Extraction and Pattern Matching", The Institute of Electronics, Information and Communication Engineers Society Paper (D), vol. J80-D-II, No. 8, pp 2170-2177 (1997) may be used for a detecting method.

Figure 2:
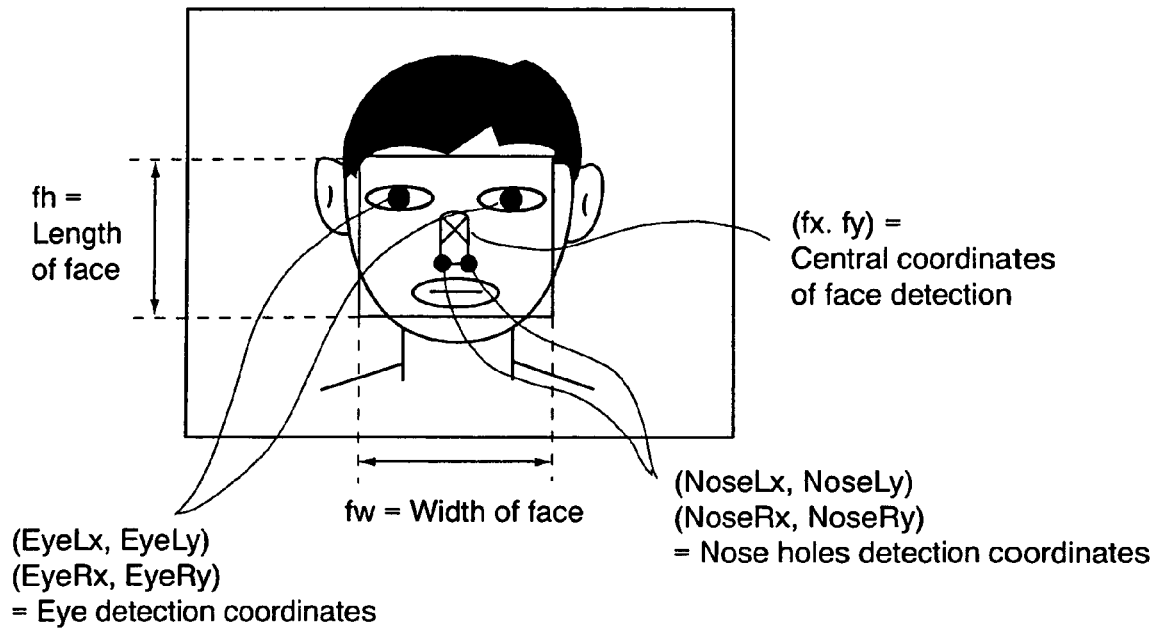
FIG. 2 is a schematic diagram for explaining the process of a face detector.

Here, it becomes possible to detect the face using a face template and check the direction of the face according to correlative positions of detected coordinates of parts comprising a face such as eyes, nose, etc. For example, when the central coordinates of the detected result of a face are assumed as the central coordinates (fx, fy), face sizes as (fw, fh), the detected results of left and right eyes and nose as (EyeLx, EyeLy), (EyeRx, EyeRy), (NoseLx, NoseLy) and (NoseRx, NoseRy), respectively as shown in FIG. 2, coordinates indicating the face direction are obtained by the following formula:

Face direction ($X$ direction)=((Eye$Rx$+Eye$Lx$)/2−$fx$)/$fw$

Face direction ($Y$ direction)=((Eye$Ry$+Eye$Ly$)/2−$fy$)/$fh$

When the original points of these coordinates are at the upper left of the screen, numeral values becomes large when the face is directed to the lower right.

The feature amount extraction unit 107 carves out the face area in a fixed size and shape based on the position of parts comprising a face detected by the face detector 106 and extracts its light and dark information as feature amount of the face. Here, for example, the light and dark values of an area of m pixels×n pixels are used directly as the information and the m×n dimensional information is used as feature vector.

Figure 3:
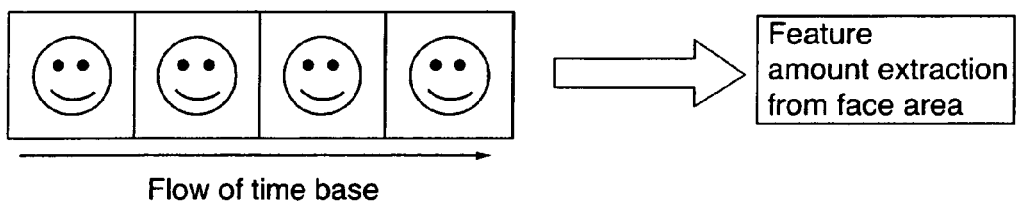
FIG. 3 is a schematic diagram for explaining the process of a feature amount extraction unit.

FIG. 3 shows face image data obtained by processing an input image by the feature amount extraction unit 107. These data are time series obtained data. A subspace is calculated by obtaining a correlative matrix of feature vector and regular orthogonal vector by a well-known K-L expansion. The subspace is calculated by obtaining a correlative matrix (or a covariance matrix of a feature vector and then, a regular orthogonal vector (an eigenvector) by the K-L expansion. A subspace is expressed by selecting number of k eigenvectors corresponding to feature values in order of sizes and using the assembly of eigenvectors.

In this embodiment, a correlative matrix Cd is obtained from the feature vector and by diagonalizing the correlative matrix $$Cd=\Phi dAd\Phi dT,$$

$\Phi$ of eigenvector is obtained. This subspace is used as a recognizing dictionary for the verification of persons. When this information is registered in advance, it is registered as a dictionary.

Further, a subspace itself is usable as input data for executing the recognition as described later. Therefore, the calculated result of subspace is sent to the recognizer 109 and the registered information memory 108.

The registered information memory 108 stores subspaces (or correlative matrixes) for the verification of a reregistered person 100 with corresponding discriminating information such as ID numbers for the verification of a recognized person 100. Further, time, date, place and other status information when registered can be stored. In addition, not limiting to subspace but input face image and feature amount of extracted face may be stored.

The recognizer 109 recognizes a person taken by the camera 101 from a registered person 100 or verifies whether the person is an applicable person by collating (comparing) the feature amount (light and dark information or subspace information) obtained by the feature amount extraction unit 107 with the recognized data stored in the registered information memory 108. To recognize a person, it is only necessary to obtain a person whose data are most similar to the data of the person taken by the camera 101, and a person who is corresponding to the most similar data can be determined as a recognized person.

Further, when persons are recognized according to face images using such individual identification information as ID numbers, personal identification numbers, and similarity to recognized data corresponding to identification information of respective person is calculated. This similarity is collated with the set authentication threshold value and when the authentication threshold value is exceeded, the person is verified to be that person.

This individual identification information such as ID numbers, personal identification numbers, and keys can be input using the input unit 103.

When information of the feature amount extraction unit 107 is used, a subspace method or a multiplex similarity method is usable as a recognition method. In this embodiment, for example, a mutual subspace method that is a well-known recognizing method disclosed in a literature (Ken-ichi Maeda, Sadakazu Watanabe: "A Pattern Matching Method with Local Structure", Electronic Information Communication Society Paper (D), vol. J68-D, No. 3, pp 345-352 (1985)) is used.

In this mutual subspace method, recognized data in the pre-stored registered information and input data are expressed as subspaces and an "Angle" formed by two subspaces is defined as the similarity. Subspaces input here are called as input subspaces. A correlative matrix Cin is obtained likewise for an input data matrix and diagonalized as shown below:

$$Cin = \Phi in A in \Phi in T$$

and an eigenvector Φ is obtained. Similarity (0.0 to 1.0) of the subspace expressed by two Φin and Φd is obtained and used as the similarity for recognizing it.

Further, for conformity with the registered biometric information, an example using "Similarity" is used in this embodiment but a correlative value or a Euclidean distance is usable.

When recognizing a person by the recognizer 109, similarities with all subspace information (registered information) stored in the registered information memory 108 are first obtained. When the similarity of a person having the most high among the obtained similarities becomes above a prescribed authentication threshold value, that person is recognized as a said person. When the highest similarity is lower than the authentication threshold value, a person can be judged to be not a person registered in advance. This recognizing method is defined "1:N Collation" and used repeatedly in the subsequent explanation.

On the other hand, when ID Number, etc. are input through the input unit 103 as information to identify a person, the similarity with the subspace corresponding to that identification information only is calculated. When the calculated similarity becomes higher than the predetermined authentication threshold value, that person is recognized as the said person. This recognizing method is defined as "1:1 Collation" in this invention and is used repeatedly in the subsequent explanation.

Further, regarding "1:n Collation" between "1:1 Collation" and "1:N Collation", a case wherein identification information commonly applicable to plural persons in the entire registered persons is assumed. When this identification information is input, the similarities with one or plural registered persons corresponding to the identification information are calculated. And when the highest similarity among the calculated similarities is higher than the authentication threshold value, it is considered that a registered person applicable to that identification information comes.

For example, "1:n Collation" is used in a case wherein a group number common to plural persons is input as an identification information and decide whether a person is belonging to that group. Basically, the similarities with all of registered persons are not calculated but the collation is made with plural persons out of the all registered persons. Thus, the whole operation is common to the operation of "1:N Collation" and therefore, "1:n Collation" will be explained by including in the explanation of "1:N Collation" in this embodiment.

The history information memory 110 stores the recognized result obtained by the recognizer 109, time and place of the recognition performed, input identification information and an image itself input through the image input unit 105, facial feature information obtained from the feature amount extraction unit 107 as history information.

Figure 4:
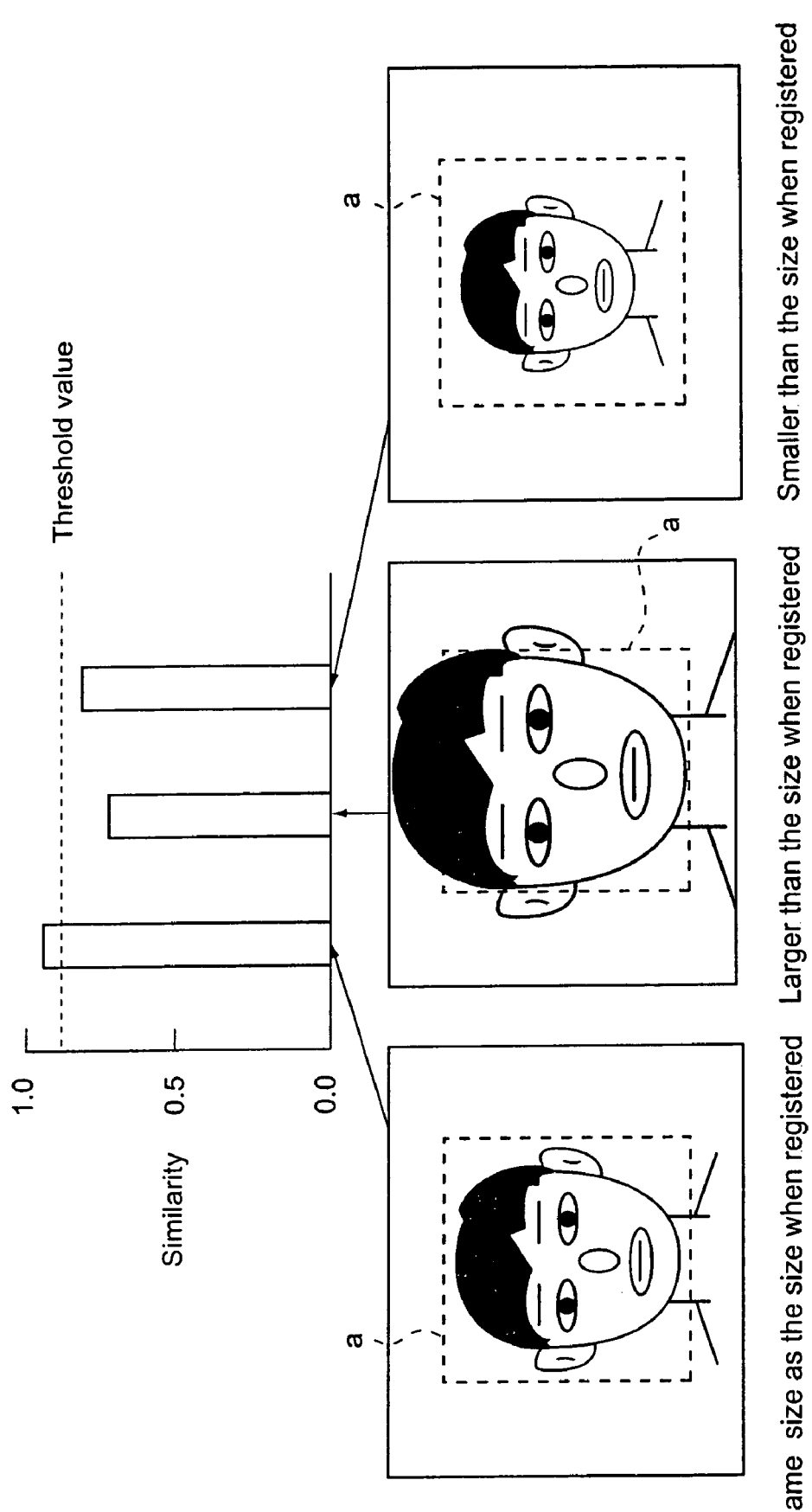
FIGS. 4A to 4C are schematic diagrams for explaining the change of the status from the state at the time of registration.

The method described above is able not only to recognize persons but also applicable to control of passage of persons and access according to the recognized result. However, in the case of person recognizing apparatus using face images, recognizing rate can be lowered for secular or time change of standing position or posture of persons as shown in FIGS. 4A to 4C. In FIGS. 4A to 4C, the frame a shown by the broken line shows a face size when registered.

When, for example, there is still a face existing in an image at the time of recognition (when collated) in the same state as that when registered as shown in FIG. 4A, the feature information can be extracted in the state close to that when registered and therefore, the similarity with the registered information (dictionary) tends to become high. However, when a face is larger or smaller than that at the time when registered as shown in FIGS. 4B and 4C or when the face direction differs though not illustrated, the similarity tends to become low.

In order for solving such problems, it becomes necessary to reduce the drop of the similarity by adding information to or partially rewriting biometric information stored in the registered information memory 108.

Figure 5:
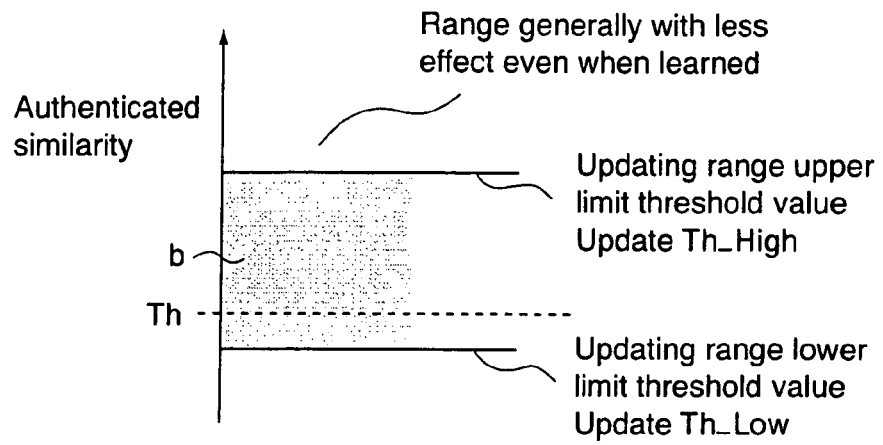
FIG. 5 is a flowchart for explaining the range of automatic updating of registered information.

So, a criterion for judging whether the registered information (dictionary) should be updated are provided to the registered information updating unit 111 independently from "Authentication Threshold Value" that is a judging criterion to determine whether persons are registered persons in the recognizer 109. As this criterion, the registered information is updated when the similarity is within one or plural ranges. One example is shown in FIG. 5.

It is necessary to prevent the learning of personal feature information separate from applicable feature information. For this purpose, the similarity is above "Authentication Threshold value Th" is one condition in this embodiment. Shown in FIG. 5 is an example wherein "Update Th_Low (Updating Range Lower Limit Value)" and "Th (Authentication Threshold Value)" are regarded as different values. However, these values may be set at the same value as explained here.

Further, when information similar to the feature information already leant in the registered information (dictionary), its learning effect is generally small. In addition, the similarity of such information with the feature information becomes high and therefore, a threshold value that becomes the upper limit is set for the registered information updating range. This value is equivalent to "Update Th_High (Updating Range Lower Limit Threshold Value)" shown in FIG. 5 and the hatched range b in FIG. 5 is equivalent to the registered information updating range of this embodiment.

As a result, it is possible to effectively update registered information at less number of updates by having the system learn feature information of low similarity. In this embodiment, the system is explained by taking an example to define one range determined by one combination of upper and lower limits but the range may be defined with plural ranges. Further, the upper and lower limits may be set at the same values of the upper and lower values of the similarity.

When making the updating of registered information (dictionary), a correlative matrix value obtained from the input face feature information to a value stored as the registered information and then, a subspace obtained through the K-L expansion is again stored as the updated registered information.

Further, in the first embodiment, there is no dependence especially on a method to rewrite the contents of registered information. Therefore, the updating of the registered information can be achieved by rewriting a part of the facial feature information at a specific ratio, completely rewriting the whole contents into input facial feature information, or having the registered information memory 108 to hold plural templates per person. Subjects for updating of the registered information is the registered information of recognized persons in case of "1:1 Collation" and the registered information having the highest similarity in case of "1:N Collation".

Further, in the registered information updating unit 111 explained above, the updating range is set commonly for all registered persons; however, it is possible to set a different updating range for each registered person.

For example, in the case of "1:1 Collation", the updating range can be set individually for each input ID number or in the case of "1:N Collation", the updating range may be changed according to the first ranked ID No. For example, in the case of those users who are ordinarily less failed to collate, it is not necessary to set updating frequencies to a so high level. Therefore, the application to set the updating range narrow is possible.

Figure 6:
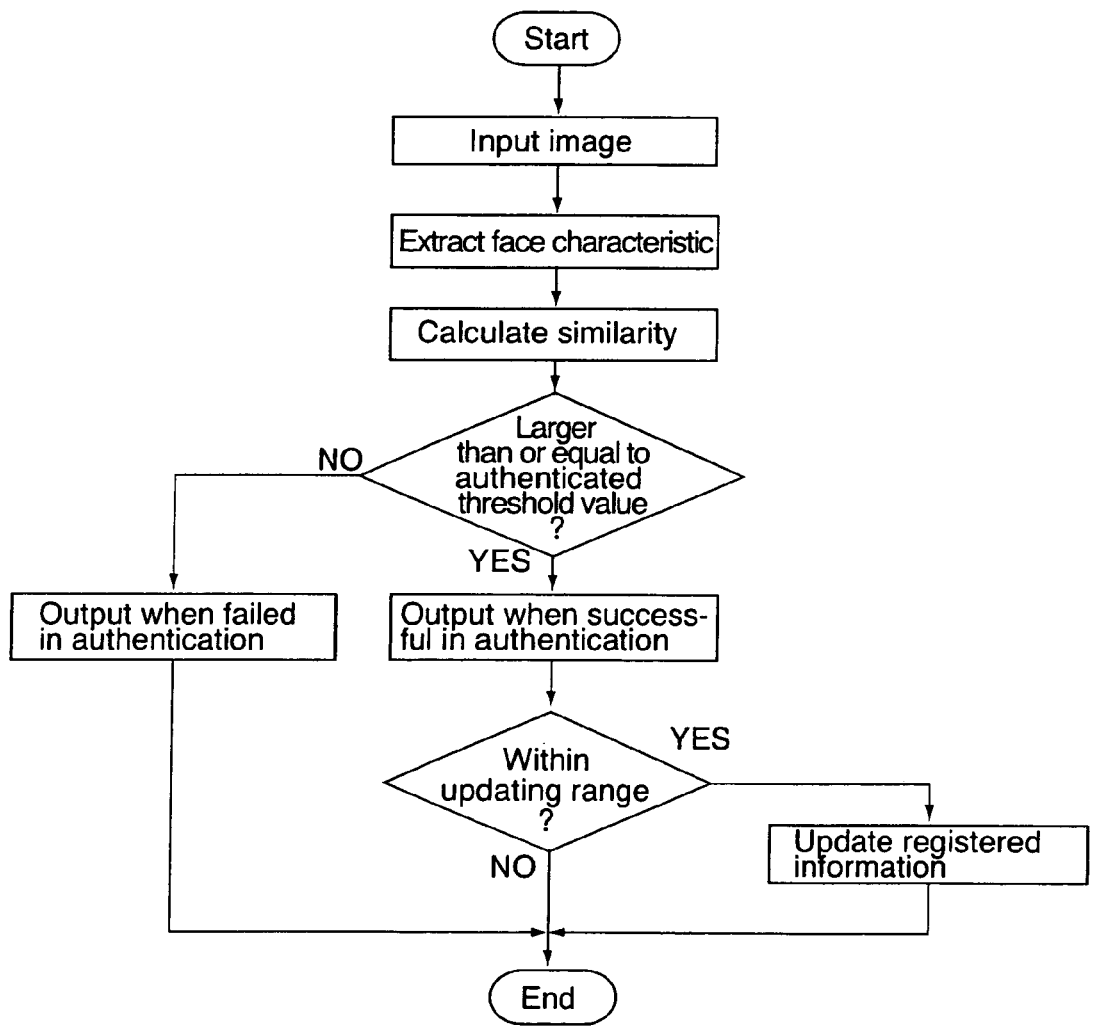
FIG. 6 is a flowchart for explaining the flow of process for automatically updating registered information.

The flow of process described above is shown in a flowchart in FIG. 6.

Next, a second embodiment will be explained.

Further, the equipment construction, the basic operation of the second and the applying method are similar to the first embodiment and therefore, the explanation thereof will be omitted.

The second embodiment features that the weight (ratio) when updating the registered information is changed according to values of similarities obtained at the time of recognition. So, the function of the registered information updating unit 111 differs somewhat from the first embodiment. This will be explained below.

The registered information updating unit 111 judges whether the registered information should be updated using the result of recognition of the recognizer 109 and/or historical information in the history information memory 110. The registered information of the registered information memory 108 is updated based on the result of this judgment.

For criteria to judge the necessity for updating the registered information in the registered information updating unit 111, anyone is usable. Here, the updating will be explained taking an example used in the first embodiment to determine whether the similarity at the time of recognition is in the updating range. However, a judging method that is explained in a third embodiment and subsequently may be used. A method to update the registered information only when urging to input identification information known only by a said person such as a personal identification number by the input unit 103, the said person could be confirmed may be used.

Further, for simply explaining, two examples to change registered information updating ratio using similarities obtain by the recognizer 109 are taken in this embodiment. However, multiple updating rations are usable and changeable using functions for calculating updating ratios.

Figure 7:
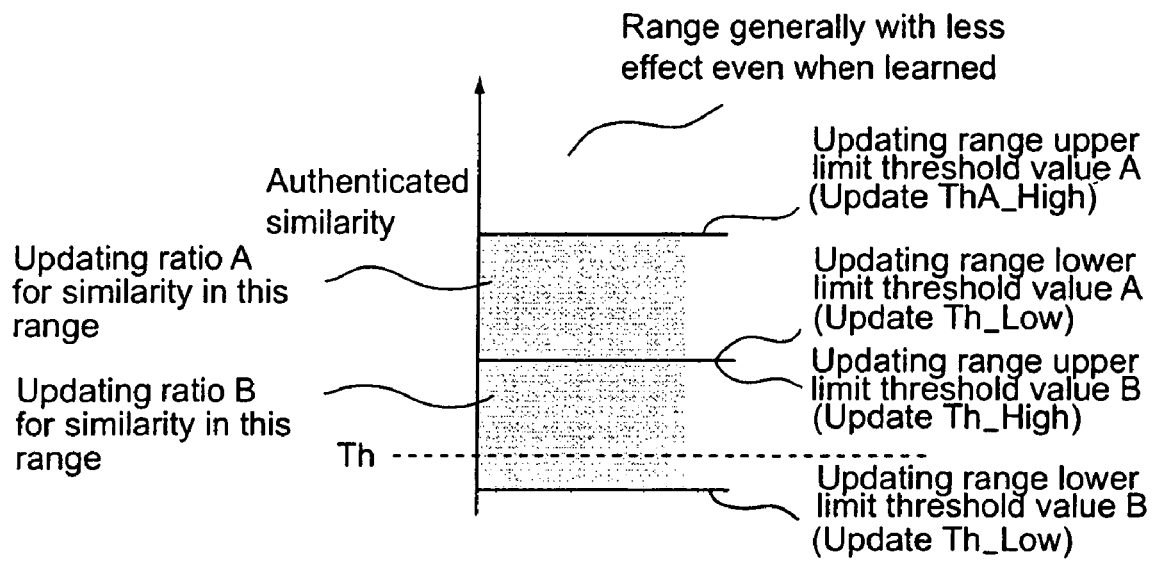
FIG. 7 is a flowchart for explaining the criteria of judgment of the registered information updating method of a person recognizing apparatus involved in a second embodiment.

Hereinafter, a method to change the registered information updating ratio according to similarities obtained by the recognizer 109 in the registered information updating unit 111 will be explained referring to FIG. 7.

In this embodiment, when updating the registered information, a correlative matrix value obtained from an input facial feature information is added to a value stored as the registered information and the subspace obtained by the K-L expansion is stored again as the updated facial feature information (the registered information).

At this time, the weight of a correlative matrix value newly added to the registered face feature information (the registered information) is changed according to the similarity obtained by the recognizer 109. For example, when the similarity is less than the updating range upper limit threshold value B and more than or equal to the updating range lower range threshold value B, the registered information is updated using the updating ratio B as shown in FIG. 7. Similarly, when the similarity is less than the updating range upper limit threshold value A and more than or equal to the updating range lower limit threshold value A, the registered information is updated using the updating ratio A.

Here, the weight of the updating ratio B for the lower similarity of the registered information is set at a higher level and the contents of the registered information is changed at the outside when the fluctuation from the contents of the registered information is becoming large. Definitely, when updating the registered information using the updating ratio B ($0 \leq B \leq 1$), the correlative matrix is added by changing the weight to (1−B) for the existing feature information and B for the input side feature information to which the correlative matrix is to be added.

Next, a third embodiment will be explained.

Further, the equipment construction and the basic operation of the third embodiment are similar to the first embodiment and therefore, the explanation thereof will be omitted.

The third embodiment features that the registered information updating is judged based on whether a difference in the similarity with the registered information of other person (a difference between the first and second ranks) is more than or equal to a fixed value. Therefore, the function of the registered information updating unit 111 slightly differs from the first embodiment. The function will be explained below.

The registered information updating unit 111 judges whether the registered information stored in the registered information memory 108 should be updated using one or plural similarities obtained by the recognizer 109. The registered information of the registered information memory 108 is updated based on the result of this judgment. In the third embodiment, in the case of not only "1:N Collation" to obtain the similarity with the registered information for all registered person but also "1:1 Collation" and "1:n Collation", the similarities with all registered persons are calculated.

Figure 8:
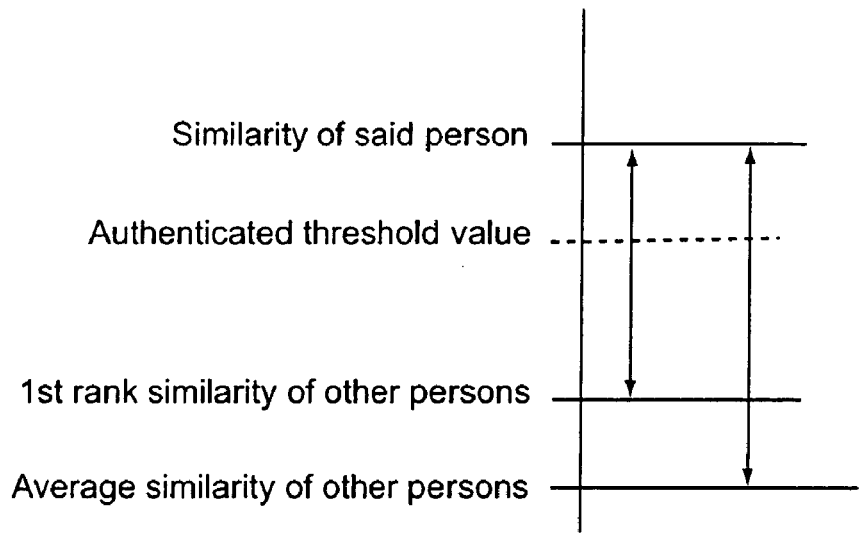
FIG. 8 is a flowchart for explaining the registered information updating of the person recognizing apparatus involved in a third embodiment.

First, the updating judging method in the case of "1:1 Collation" will be explained referring to FIG. 8. In the case of "1:1 Collation", the similarity equivalent to the said person is known. In this case, as the similarity with other person than the said person, one or plural "Similarity of Other Person" is calculated. When "First Ranked Similarity of Other Person" having the highest similarity is obtained and there is a sufficient difference between the similarity of the said person and "First Ranked similarity of Other Person", the person is judged to be truly the said person and the registered information is automatically updated.

If a registered other person was authenticated, the similarity regarded as "First Ranked Similarity of Other Person" and originally for "Said person" is obtained and therefore, "First Ranked similarity of Other Person" will become high. If an unregistered person was authenticated, all similarities become low and the similarity of said person becomes low. Differing from a case wherein the said person was authenticated, it is possible to prevent the erroneous learning of other persons for registered information using the fact that a difference between the similarity of the person and "First Ranked Similarity of Other Person" dents to become small. Needless to say, it is possible to jointly use a method in the first embodiment that the similarity of said person is within a range of a fixed value.

Further, in the case of "1:1 Collation", it is possible to prevent the erroneous leaning to update the registered information by an unregistered person by using a difference with a mean value of similarities of all other persons for "First Ranked Similarity of Other Person".

In addition, it is also possible to make the judgment according to an independent value of "Second Ranked Similarity" next to the highest similarity of all similarities. In this case, if other person was first ranked, a said person is expected to take a certain high level of similarity and when "Second Ranked Similarity" is high, it becomes possible to regard that other person or unregistered person authenticated.

Next, the updating judging method in the case of "1:N Collation" and "1:n Collation" will be explained using FIG. 9. In the case of "1:N Collation" and "1:n Collation, as no identification information was input in advance, there is no similarity equivalent to "Said Person" and therefore, the similarities of all persons are calculated and the highest similarity "First Ranked Similarity" and "Second Ranked Similarity" are used.

Figures 9A, 9B:
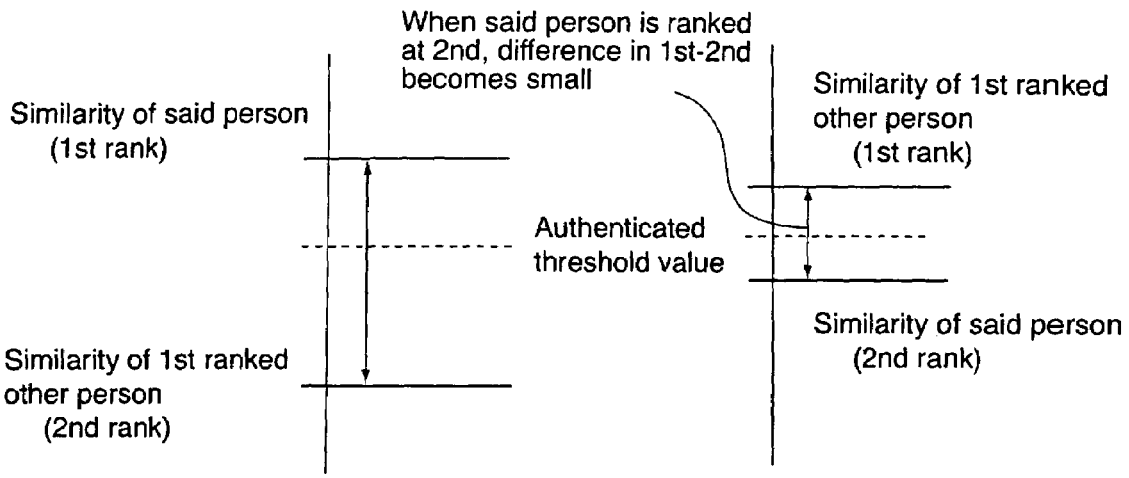
FIGS. 9A and 9B are flowcharts when another person has a higher similarity than a recognized person involved in the third embodiment.

As shown in FIG. 9A, when the said person was properly ranked at the first similarity, a difference from the second ranked similarity becomes large and "First Rank-Second -Rank Similarity Difference" that is a difference between the "First Ranked Similarity" and "Second Ranked Similarity" becomes sufficiently large. From this, when this value is larger than a prescribed threshold value or in the range defined by plural threshold values, the updating is executed using the face feature information input for the registered information with the first rank similarity given.

On the other hand, as shown in FIG. 9B, if the similarity equivalent to the said person was low to below the second rank, the similarity corresponding to other person's registered information is calculated as "First Ranked Similarity". In this case; however, the similarity of the said person becomes the second rank or higher than it and another person's similarity becomes the second rank and "First Rank-Second Rank Similarity Difference" becomes smaller than that when the said person's similarity becomes the first rank. In this case, it is possible to use not only the said judging criterion but also the verification jointly to check whether "First Similarity" is a prescribed similarity as shown in the first embodiment.

Likewise in the case of "1:1 Collation", it is possible to use a method to update registered information when "Second Rank Similarity" only is a subject of evaluation and "Second Rank similarity" is lower than a prescribed threshold value or within the range of similarity defined by plural threshold values.

Further, in the registered information updating unit 111, a common updating range is set for all registered persons. However, in the case of "1:1 Collation", the updating range is set individually for every input ID No. In the cases of "1:N Collation" and "1:n collation", the updating range is changed according to the first ranked ID No. Thus, it is possible to set a different updating range for every registered person. For example, in the case of a user who does not fail ordinary in the collation, it is not necessary to increase the updating frequency and it is therefore possible to set the updating range narrow.

Further, likewise the first and second embodiments, it is assumed that the ranges of threshold values and similarities that are used can be either common to all registered persons or for individual person.

Next, a fourth embodiment of this invention will be explained.

Further, the equipment construction, basic operation and applying method in the fourth embodiment are the same as those described in the first embodiment and therefore, the explanation thereof will be committed here.

The fourth embodiment features that the updating of registered information is judged according to whether the means similarity of persons becomes high when collating with individual history information. Therefore, the function of the registered information updating unit 111 slightly differs from that in the first embodiment and will be described below.

The registered information updating unit 111 judges whether the registered information should be updated using the recognizing result of the recognizer 109 or the history information stored in the history information memory. The registered information stored in the registered information memory 108 is updated based on the result of this judgment.

In the registered information updating unit 111, after judging whether a person is a registered person by the recognizer 109, "Tentative Registered Information (Tentative Dictionary)" that is prepared when the registered information was updated using the face feature information obtained by the feature amount extraction unit 107 is prepared. In the case of "1:1 Collation", "Tentative Registered Information" is prepared based on the registered information equivalent to a said person. In the cases of "1:n Collation" or "1:N Collation", "Tentative Registered Information" that is prepared when the registered information was updated for the registered information given with the highest similarity is prepared.

"Tentative Registered Information" is not the registered information actually stored in the registered information memory by directly rewriting but is prepared separately from the registered information tentatively. When preparing this tentative registered information, a correlative matrix value obtained from the input face feature information is added to a value stored as the registered information and then, a subspace obtained through the K-L expansion is made tentative registered information after updating.

Further, the fourth embodiment has no dependence especially for a method to rewrite the contents of registered information. Therefore, the updating of registered information can be achieved also by rewrite a part of face feature information at a specific ratio, completely rewriting the whole contents to input face feature information or storing plural templates per person in the registered information memory 108.

When the tentative registered information is prepared, in the case of "1:1 Collation, the similarity with one or plural face feature information input in the past corresponding to the identification information input through the input unit 103 and stored in the history information memory 110 as history information is calculated. In the case of "1:n Collation" or "1:N Collation", the similarity with one or plural face feature information input in the past and stored in the history information memory 110 as the history information corresponding to the first rank similarity is calculated. Similarly, by processing the existing registered information stored in the registered information memory 108 and the similarity is calculated. As a result, if a mean similarity of the tentative registered information with one or plural feature information input in the past becomes higher, the registered information stored in the registered information memory 108 is replaced by the tentative registered information and is registered as an original dictionary.

Figure 10:
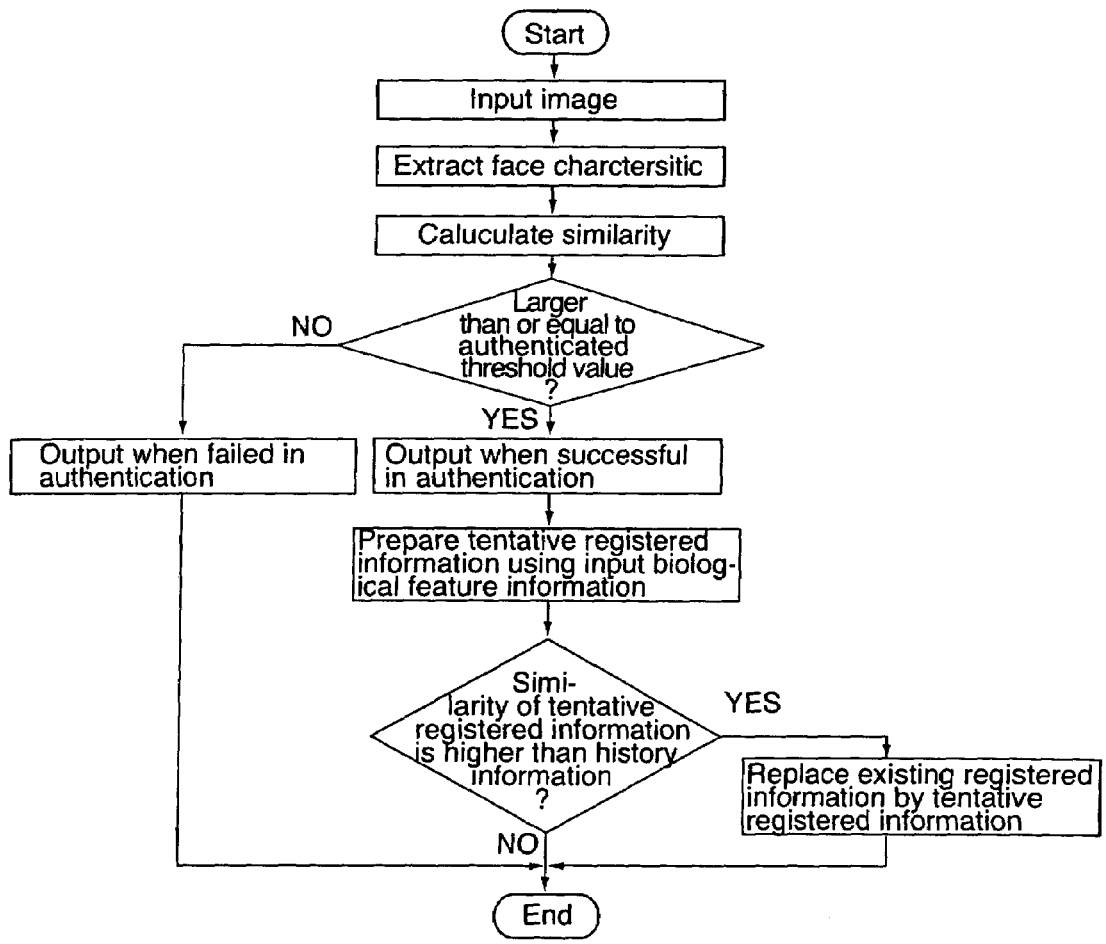
FIG. 10 is a flowchart for explaining the flow of the registered information updating process in the person recognizing apparatus involved in a fourth embodiment.

The flow of processing explained above will be shown in a flowchart in FIG. 10.

Further, in the above explanation, the comparison is made by a mean similarity with the past history information but this invention can be realized even when the similarity is at the lowest or highest level.

Next, a fifth embodiment of this invention will be explained.

Further, the equipment construction, basic operation and applying method in the fifth embodiment are the same as those described in the first embodiment and therefore, the explanation thereof will be omitted here.

The fifth embodiment features that if the necessity for updating registered information is hardly judged, an input image or face feature information is reserved and later selected and updated. So, the function of the registered information updating unit 111 slightly differs from the first embodiment and explained below.

The registered information updating unit 111 determines whether the registered information should be updated using the recognized result of the recognizer 109 or the history information stored in the history information memory 110. The registered information stored in the registered information memory 108 is updated based on the result of decision.

Figure 11:
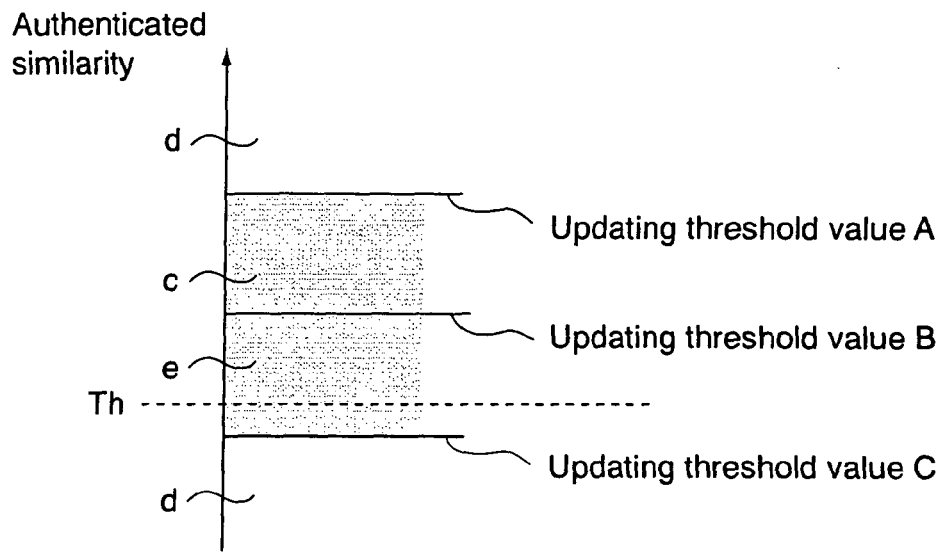
FIG. 11 is a flowchart for explaining the registered information updating judging method involved in a fifth embodiment.

In the registered information updating unit 111, there are provided, for example, a range c automatically updated, a range d not automatic updated, and separately from these ranges, a range e for storing feature information to determine whether they are update later by checking as shown in FIG. 11. As explained in the first embodiment, for example, even when data that can be judged effective when updated, when a person cannot be confirmed to be the registered said person, the input image or face feature information at that time is stored in the history information memory 110 and can be updated later additionally by visually checking the information.

When the similarity obtained in the recognizer 109 is in the range c for automatically updating, it is possible to update registered information similarly the techniques explained up to the fourth embodiment. Further, although an updating range is provided commonly to all registered persons, in the case of "1:1 Collation", it is possible to set a range individually for every input ID No. In the case of "1:N Collation", it is also possible to set a different updating range for every registered person y changing the updating range according to the first rank ID No. For example, in the case of a user who is less failed in collation ordinarily, it is not necessary to set the updating frequency so high and the updating range can be set narrow.

Regarding the information stored in the history information memory 110 as required for checking the necessity for updating according to the flow of the above process, the information will be explaining assuming that the information is checked while displaying the contents of history information using the display 102. However, the contents of the history information memory 110 may be transferred to another terminal equipment and the check or indication may be made there.

Figure 12:
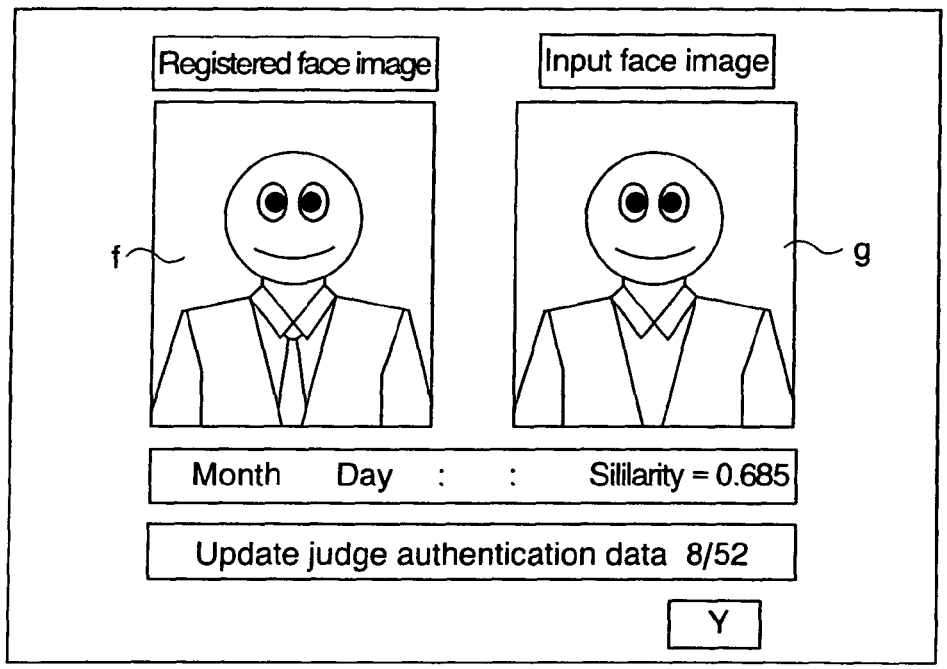
FIG. 12 is a schematic diagram for explaining a visual checking and updating method of registered information in the person recognizing apparatus involved in the fifth embodiment.

Regarding the image construction displayed on the display 102, a face image f of an original registered person and an input image g of information requiring the confirmation are displayed side by side as shown in FIG. 12 to learn the registered information stored in the registered information memory 108 additionally when both persons could be confirmed as the same person. Needless to say, such the display is not indispensable for applying this embodiment and therefore, face feature information itself can be displayed.

Further, when executing the face collation using continuous data, the collation can be made by inputting plural face images and moving images.

Next, a sixth embodiment of this invention will be explained.

Further, the equipment construction, the basic operation and the applying method in the sixth embodiment are the same as those explained in the first embodiment and therefore, the explanation thereof will be omitted here.

The sixth embodiment features to judge whether the registered information is updated according to a time required for the recognition or the number of recognition retried. So, the functions of the registered information updating unit 111 are slightly different from those in the first embodiment and will be explained below.

The registered information updating unit 111 judges whether the registered information should be updated using the result of recognition of the recognizer 109 and the history information stored in the history information memory 110. Based on the result of this judgment, the registered information stored in the registered information memory 108 is updated.

Further, it is assumed that in the sixth embodiment, the recognizing process is executed repeatedly in the recognizer 109 until the final recognizing result is obtained. Such methods as "execute the recognizing process repeatedly up to the specified number of times when the similarity does not exceed an authentication threshold value", "complete the recognizing process at the point of time when the similarity exceeds an authentication threshold value" are adopted. Needless to say, it is possible to use the same technique from the first to the fifth embodiments. However, this embodiment uses the number of recognizing process executed and times needed and therefore, this method is always used.

Figure 13:
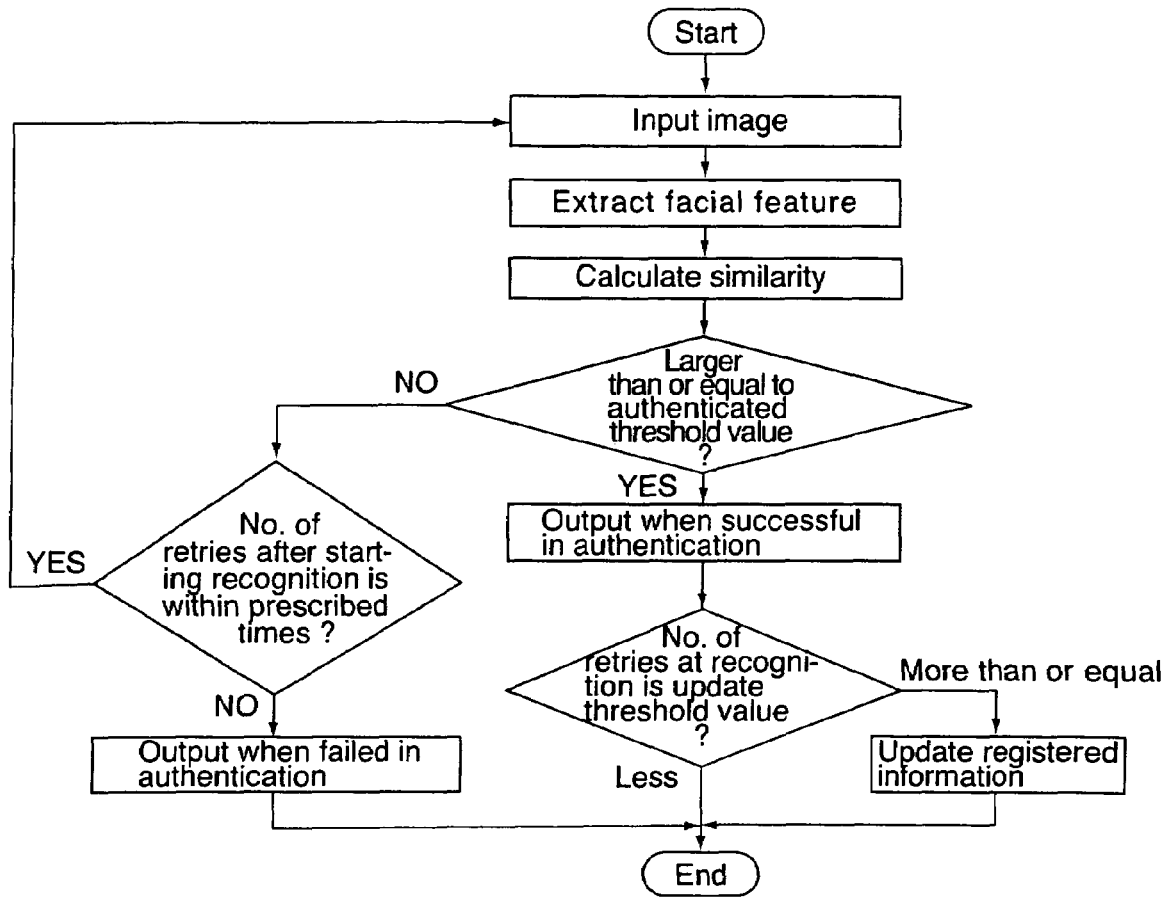
FIG. 13 is a flowchart for explaining the flow of the registered information updating process in the person recognizing apparatus involved in a sixth embodiment.

The closing of the recognizing process in this embodiment is as shown in a flowchart in FIG. 13. For the criterion to judge failure of recognition, not only the number of repeated times of recognition (the number of retried times) but also a time elapsed from the start of the recognizing process can be used.

Hereinafter, a registered information updating method in the registered information updating unit 111 will be explained.

As shown in the flowchart of FIG. 13, when the recognition was completed, the number of retried times up to the success of recognition is obtained. When the number of retried times is more than or equal to the number of prescribed times (an updating threshold value), "Data not leaned was input to the registered information for a registered person and a long time was needed for the recognition" is judged and the registered information is updated. On the other hand, when number of retried times is less than a prescribed number of times (an updating threshold value), it is judged that "Data extremely similar to the registered information was input and the recognition was completed in a short time" and the registered information is not updated.

Figure 14:
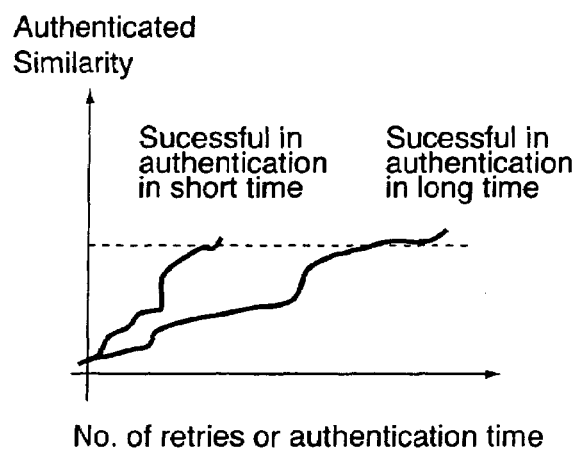
FIG. 14 is a chart for explaining the registered information updating judging condition in the person recognizing apparatus involved in the sixth embodiment.

Here, a graph shown in FIG. 14 is for explaining judging conditions for the registered information updating described above.

Further, in the above explanation, number of retried times of recognition is used for the judging criterion but the judgment may be made based on a time elapsed from start of the recognizing process.

Further, in the registered information updating unit 111, a common updating range is set for all registered persons. However, in the case of "1:1 Collation", it is possible to individually set a range for every input ID No. In the case of "1:N Collation", it is also possible to set a different updating range for every registered person by changing the updating range according to a first ranked ID No. For example, in the case of a user who is less failed to collate ordinarily, it is not necessarily needed to make the updating frequency high and therefore, the updating range can be set narrow.

In this embodiment, when updating the registered information, after adding a correlative matrix value obtained from the input face feature information to a value stored as the registered information, a subspace obtained through the K-L expansion is made tentative registered information after updated.

Further, in the sixth embodiment there is especially no dependence on a method to rewrite the contents of registered information. Therefore, the updating of registered information can be achieved by rewriting a part of face feature information at a specific ratio, fully rewriting the whole contents into the input face feature information or storing plural templates per person in the registered information memory 108.

Further, when the recognition is repeated, there exists one or plural input face feature information and therefore, all information are added to the registered information when updating the registered information. Further, all information may be limited to a specified number without using all of them or may be used selectively for the updating using the progress of similarity with the registered information.

Next, a seventh embodiment of this invention will be explained.

The seventh embodiment is an example when the person recognizing apparatus explained in the first embodiment is applied to a passage controller to control the passage of passengers by recognizing the face images of passengers.

Figure 15:
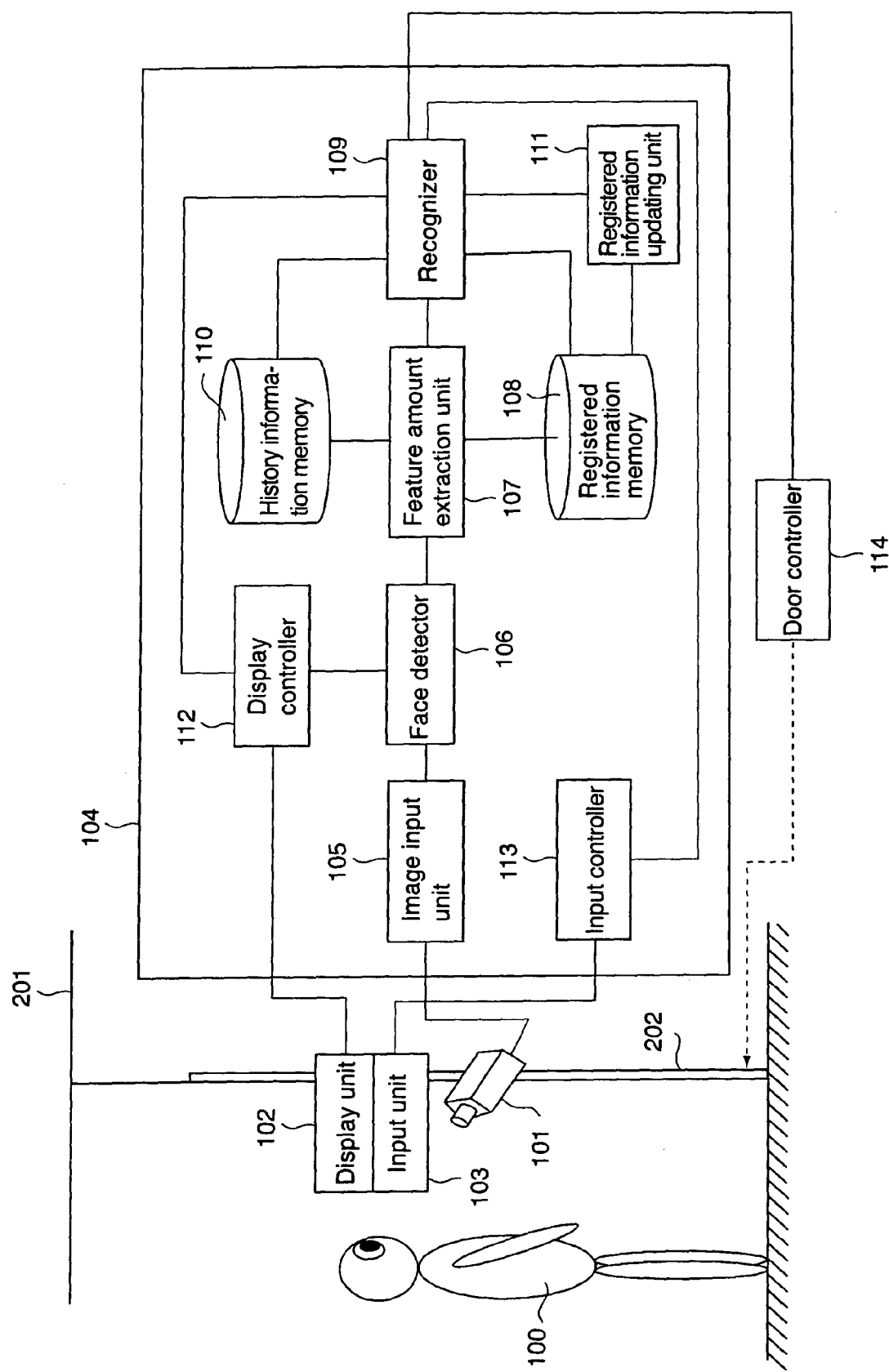
FIG. 15 is a block diagram schematically showing the structure of the passage controller involved in a seventh embodiment.

FIG. 15 schematically shows the construction of the passage controller involved in the seventh embodiment. This passage controller controls the enter/exit to/from a security facility (security rooms, etc.) This passage controller recognizes a face image of a user (a passenger) and based on the recognized result, controls the open/close of the enter/exit door of a security facility. This passage controller is composed of the camera 101, the display 102, the input unit 103, the processor 104 and a door controller 114 that is a passage control means to control the opening/closing of the enter/exit door 202 of a security facility 201 according to the recognized result of the recognizer 109.

Further, in FIG. 15, parts other than the door controller 114 are the same as those of the personal recognizer shown in FIG. 1 and assigned with the same reference numerals and the explanation there of will be omitted.

The recognizer 109 outputs a signal of "Open Door" to the door controller 114, for example, when the obtained similarity is larger than the obtained authentication threshold value and outputs the signal "Close Door" to the door controller when the obtained similarity is smaller than the authentication threshold value. The door controller 114 controls the enter/exit door 202 in the open state when the "Open Door" signal is received from the recognizer 109 and approves a recognized person 100 (a passenger in this case) to enter into the room and maintains the enter/exit door 202 in the closed state when the "Close Door" signal is received and rejects the entry of a registered person 100.

Thus, according to the seventh embodiment, it is possible to control the passage of passengers using the person recognizing apparatus explained in the first embodiment.

Further, a case where the person recognizing apparatus explained in the first embodiment is applied is explained in the seventh embodiment but it is needless to explain that the person recognizing apparatus explained in the second through the sixth embodiments is also applicable.

As explained above, according to the embodiments described above, when registered information (a dictionary) used for recognizing persons is efficiently learning without burdening recognized persons with load, it becomes possible to reduce erroneous excluding rate of registered person for secular change and/or fluctuated input information at the time of recognition.

Further, when the registered information is automatically updated using recognized data without priority difference to authentication threshold values (successfully authenticated data), registered information can be effectively leaned without increasing a burden to recognized persons.

As described in detail, according to this invention, a person recognizing apparatus, it is possible to provide a person recognizing method and a passage controller capable of reducing erroneous recognizing rates of registered persons for their secular changes or fluctuated input information at the authentication.

Further, according to this invention, it is possible to provide a person recognizing apparatus, a person recognizing method and a passage controller capable of learning registered information (a dictionary) effectively without increasing a burden to recognized persons.

What is claimed is:

1. A person recognizing apparatus comprising:
a biometric information input unit to input biometric information of persons subject to recognition;
a registered information memory to store biometric information of persons subject to recognition in advance as registered information;
a recognizer to obtain similarities of biometric information input by the biometric information input unit and registered information stored in the registered information memory by collating both of them and recognize the person based on the obtained similarity; and
a registered information updating unit to judge whether the similarity obtained by the recognizer is within a prescribed updating range and based on being judged as the similarity is within the prescribed updating range, update the registered information stored in the registered information memory by using the biometric information input by the biometric information input unit,
wherein the registered information updating unit comprises:
a first registered information updating unit to update the registered information stored in the registered information memory based on the biometric information input by the biometric information input unit when a range to update the registered information for the similarity obtained at the time of recognition in the recognizer are preset, a range not update the registered information and a range to check whether the registered information is to be updated or not and the similarity is in the range to update the registered information, and when the similarity is in the range not to update the registered information, does not update the registered information and when the similarity is in the range to check later whether the registered information is updated, stores the corresponding biometric information input by the biometric information input unit as the history information; and
a second registered information updating unit to update the registered information stored in the registered information memory based on the biometric information based on checking the biometric information stored by the first registered information updating unit.

2. A person recognizing apparatus comprising, a biometric information input unit to input biometric information of persons subject to recognition;

a registered information memory to store biometric information of persons subject to recognition in advance as registered information;

a recognizer to obtain similarities of biometric information input by the biometric information input unit and registered information stored in the registered information memory by collating both of them and recognize the person based on the obtained similarity; and a registered information updating unit to judge whether the similarity obtained by the recognizer is within a prescribed updating range and based on being judged as the similarity is within the prescribed updating range, update the registered information stored in the registered information memory by using the biometric information input by the biometric information input unit, wherein the registered information memory pre-stores biometric information of a person subject to recognition with identification information specifying the person added as the registered information and is further equipped with an identification information input unit, and wherein the recognizer obtains the similarity with the registered information corresponding to identification information stored in the registered information memory when the identification information is input in advance by the identification information input unit and recognizes a person as a person corresponding to the identification information when the obtained similarity is higher than a prescribed threshold value, obtains the similarities with all registered information stored in the registered information memory when identification information was not input in advance by the identification information input unit and recognizes a person as the person corresponding to the identification information when the highest similarity of the obtained similarities is higher than a predetermined threshold value, and obtains the similarity corresponding to the identification information stored in the registered information memory when identification information that can be partially narrowed down was input by the identification information input unit in advance, and recognizes a person as the said person corresponding to the identification information when the highest similarity of the obtained similarities is higher than a prescribed threshold value.

* * * * *